United States Patent
Weir et al.

(10) Patent No.: US 8,161,020 B2
(45) Date of Patent: Apr. 17, 2012

(54) SEARCHING FOR AND PROVIDING OBJECTS USING BYTE-BY-BYTE COMPARISON

(75) Inventors: Charles Weir, Carlisle (GB); Tommy Wildenflycht, Carlisle (GB)

(73) Assignee: Zi Corporation of Canada, Inc., Calgary, Alberta (CA)

( * ) Notice: Subject to any disclaimer, the term of this patent is extended or adjusted under 35 U.S.C. 154(b) by 939 days.

(21) Appl. No.: 11/273,361

(22) Filed: Nov. 14, 2005

(65) Prior Publication Data

US 2006/0136408 A1    Jun. 22, 2006

Related U.S. Application Data

(60) Provisional application No. 60/628,209, filed on Nov. 15, 2004.

(51) Int. Cl.
*G06F 7/00* (2006.01)
*G06F 17/30* (2006.01)

(52) U.S. Cl. ...................................................... 707/705
(58) Field of Classification Search .................. 707/705, 707/999.1
See application file for complete search history.

(56) References Cited

U.S. PATENT DOCUMENTS

| 5,202,986 | A | | 4/1993 | Nickel |
| 5,333,317 | A | | 7/1994 | Dann |
| 5,337,347 | A | | 8/1994 | Halstead-Nussloch et al. |
| 5,555,403 | A | * | 9/1996 | Cambot et al. ................... 707/4 |
| 5,577,188 | A | | 11/1996 | Zhu |
| 5,818,437 | A | * | 10/1998 | Grover et al. ................. 715/811 |
| 5,933,820 | A | | 8/1999 | Beier et al. |
| 6,108,014 | A | | 8/2000 | Dye |
| 6,172,625 | B1 | * | 1/2001 | Jin et al. ........................... 341/67 |
| 6,286,064 | B1 | * | 9/2001 | King et al. ....................... 710/67 |
| 6,484,189 | B1 | | 11/2002 | Gerlach, Jr. et al. |
| 6,633,878 | B1 | * | 10/2003 | Underwood .................. 707/100 |
| 6,643,644 | B1 | | 11/2003 | Furusho |
| 7,181,435 | B2 | * | 2/2007 | Cambot et al. .................... 707/1 |
| 2003/0167822 | A1 | | 9/2003 | Johnson et al. |
| 2004/0220941 | A1 | * | 11/2004 | Nielson et al. ................ 707/100 |

FOREIGN PATENT DOCUMENTS

| EP | 0 457 077 A2 | 4/1991 |
| EP | 0 804 769 | 2/2000 |
| JP | S63-237128 | 10/1988 |
| JP | H06-90287 | 3/1994 |

(Continued)

OTHER PUBLICATIONS

English Translation of Korean Office Action, mailed Sep. 30, 2009, in related Korean Patent Application No. 10-2007-7011082, 3 pages.

(Continued)

*Primary Examiner* — Aleksandr Kerzhner
(74) *Attorney, Agent, or Firm* — Michael A. Glenn; Glenn Patent Group

(57) ABSTRACT

Keys on an input device are selected to input a first selection and a second selection to form a byte. The byte is compared to a first byte of identification codes in a database. Such a method may use identification codes to identify pointers that correspond to objects in the database, and the pointers may indicate the address in a database where desired objects are stored. The input device has a database, a processor and executable instructions. The executable instructions may cause the processor to carry out a method of providing the objects.

17 Claims, 2 Drawing Sheets

FOREIGN PATENT DOCUMENTS

| | | |
|---|---|---|
| JP | H09-062709 | 3/1997 |
| JP | 2000-276473 | 10/2000 |
| KR | 2001-0101381 | 11/2001 |
| WO | WO 00/41062 | 7/2000 |

OTHER PUBLICATIONS

English Translation of Japanese Office Action, mailed May 19, 2010, in related Japanese Patent Application No. 2007-540470, 2 pages.

* cited by examiner

SEARCHING FOR AND PROVIDING OBJECTS USING BYTE-BY-BYTE COMPARISON

CROSS-REFERENCE TO RELATED APPLICATION

This application claims the benefit of priority to U.S. provisional patent application Ser. No. 60/628,209, filed on Nov. 15, 2004.

FIELD OF THE INVENTION

The present invention relates to methods of and devices for providing information.

BACKGROUND OF THE INVENTION

Once data has been stored, retrieving that data in an efficient manner is important. In devices having electromagnetic memories, data retrieval often takes longer than desired. To combat the delay caused by retrieving data, large memories have been utilized. However, in some devices, employing large memories is problematic. Large memories may be costly, bulky, heavy and may consume large amounts of energy. For example, the ability to employ a large memory in a cell phone or personal digital assistant ("PDA") may be limited (or impossible) given consumer demands for cheaper, smaller, lighter and more energy efficient phones and PDAs.

Further, there may be limitations on the amount of area available for displaying retrieved data. Machines, such as cell phones and PDAs, often have a small screen that may be used to display data such as phone numbers or addresses. In order to make better use of such small screens, retrieved data ought to be organized to display the data most likely desired by the user. In this manner, the user will be more likely to find the desired data among the data displayed initially on the screen. If the user does not find the desired data among those initially displayed on the screen, then the user is required to request display of retrieved data that was not initially displayed. Often, small machines will respond to a request for additional data by scrolling through retrieved data.

Delays in providing users with desired data may annoy the user. To reduce the annoyance, manufacturers have resorted to distraction techniques. For example, an icon indicative of delay may be shown. The icon may take the form of an hour glass which moves, a slide bar which is gradually filled or some other clock-like icon. Such icons reassure the user that the machine is operating despite occasional indications to the contrary, such as no apparent activity for a significant time period.

In the case where data is stored as a list, it is common for the list to be assembled and stored in alphabetic or numeric order. Using the example of a word list, when a user enters the initial character of a desired word, the word list may be searched starting at the beginning of the list. Such a search may begin by comparing the first character of the first word in the list to the entered character. If no match is determined, then the first character of the second word in the list is compared to the entered character. This process continues until the first character of a word in the list matches the entered character. Upon finding a match between the first entered character and the first character in a word in the list, the machine may stop searching the word list, and may then be ready to accept a second character of the desired word.

When the second character of the desired word is entered, there is no need to re-examine the words that are stored in the list prior to the first word having a match with the first entered character—those prior words have already been determined not to match the desired word. Therefore, searching the word list may be continued from the first word in the list that provided a match to the first entered character. Searching may resume from this point in the word list until a word is found which has a second character matching the second entered character.

For example, if a list contains the words . . . bleat breathe camera character charm chocolate corporate deny determine . . . sequentially ordered, then in response to entering "c" the first match occurs at camera and the first mismatch following camera occurs at the word deny. Five steps will have occurred between camera and deny. Therefore, the number of words beginning with "c" may be determined by counting the number of words between the first match (camera) and the first mismatch (deny) and then subtracting one from that count.

At the end of the first search, the parameters that identify where the first match is and the length of the list may be known, and stored for later use. Using the example above, the stored parameters might be {addr1,4} where addr1 is the address of camera and 4 is the number of words that begin with the letter "c". Whether or not word information is displayed via the screen to the user at this point in the search is a matter of preference.

Despite recent significant improvements in performance of computer processors, when a list is very long and the number of words stored in a particular area (in this example words beginning with "c") is substantial, the time required to search the list may make the machine noticeably slow or in extreme cases the machine may appear to have ceased functioning.

SUMMARY OF THE INVENTION

The invention may be embodied as a method of providing information. Such a method may provide an input device having at least two keys, and provide a plurality of objects stored in a database. Each object may be stored at a unique address. Pointers may be stored in the database, and each pointer may identify one of the unique addresses. Each pointer may have an identification code that is at least one byte in length. One of the keys may be selected to provide a first selection, and then one of the keys may be selected to provide a second selection. The selections may be associated with each other as a first input. The first input may be compared to a first one of the bytes of the identification codes, and pointers may be identified. The identified pointers may be those having a match between the first input and the first byte of the identification code. The identified pointers may be provided as a first group of pointers. Objects corresponding to the identified pointers may be provided to a user.

The invention may be embodied as a machine having an input device with at least two keys, a database, a processor capable of executing instructions, and a set of executable instructions. The database may have a plurality of stored objects, each object being potentially desired by a user, and also may have stored pointers, each pointer identifying an address of an object. Each pointer may have an identification code that is at least one byte in length. The executable instructions may be capable of instructing the processor to (a) accept selection of one of the keys to provide a first selection, (b) accept selection of one of the keys to provide a second selection, (c) associate the selections as a first input, (d) compare the first input to a first one of the bytes of the identification codes, (e) identify pointers for which there is a match between the first input and the byte, to provide a first group of pointers, and (f) provide objects corresponding to the identified pointers.

The invention may be embodied as a computer readable memory device. The memory device may have stored thereon instructions for causing a computer to carry out a method according to the invention.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Where multiple objects that are stored in a database are to be accessed and provided to a user, for example on a display of a cell phone or a PDA, there is no certainty that the objects can be positioned in an alphabetic list structure so that the addressed space includes all objects contiguously. For example, the user may have stored an object with an attribute that is ill suited to standard letter indexing. Therefore an intermediary step may be taken whereby objects are associated with a number sequence. For example, a letter that appears on a key of an input device may be associated with the number that also appears on that key. In one embodiment of the invention, no attempt is made to determine whether a key press is intended to indicate the letter or the number that appear on that key, and so all matches are candidates. For example, to search a simple word list for items beginning with the letter c, the user might press a key labeled "2abc", and then all candidates that begin with 2, or a, or b, or c would be identified. Although this results in a potentially very large number of objects for display as candidates, other logic may be employed to provide a user with the candidates in an order that is likely to place the desired candidate at or near the top of the list of candidates.

Figure 1:
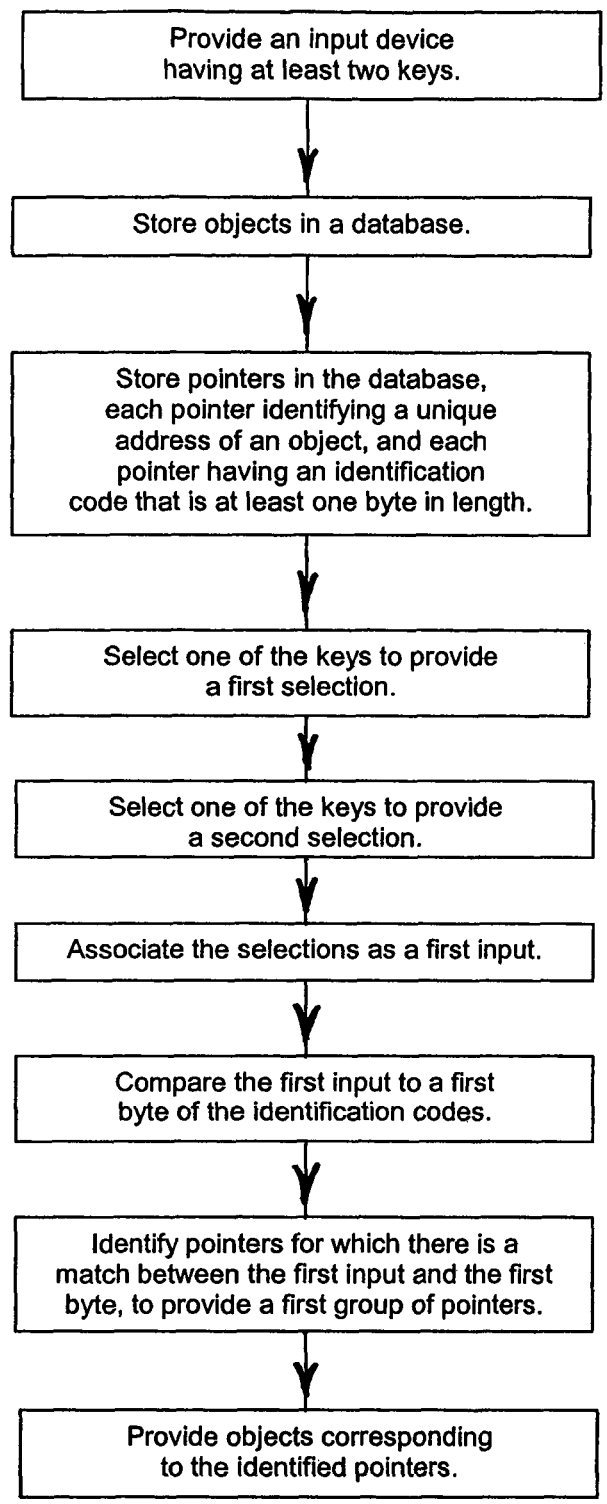
FIG. 1, which depicts steps of a method according to the invention.

FIG. 1 depicts a method according to the invention. In that method, an input device is provided 10. The input device may have at least two keys, some or all of which may correspond to more than one character. For example, in a standard input device found on many cell phones and PDAs, there is one key that corresponds to the number "2" and also the letters "a", "b" and "c", while another key corresponds to the number "3" and also the letters "d", "e" and "f". The input device may be in communication with a microprocessor, which is capable of executing instructions in a step-by-step manner. Upon selecting a key, the microprocessor may execute instructions as part of an effort to determine what the user desires. The end result of executing the instructions may be to provide objects to the user that are potentially desired by the user. For example, if the selected key is the "3def" key, then the microprocessor may provide objects that begin with the number "3", such as phone numbers or addresses. The microprocessor may also provide the user with words that begin with the letter "d" or the letter "e" or the letter "f". Objects may be provided using a screen, such as those found on cell phones or PDAs.

It should be noted that prior to selecting a key, the device, such as a cell phone or PDA, may be in an idle state. In the idle state, the device may be waiting for the user to provide an initial indication about what the user desires. In the idle state, no particular application has been indicated to the device, and any of the possible actions that may be taken using the device are assumed to be available to the user—that is to say the device is at its "home" position. From this home position, the device may provide the greatest number of options to the user, and hence there is the greatest need to quickly identify what the user may desire the device to do. It is from this home position that a method according to the invention may be the most helpful to the user.

Each object may be stored 16 in a database memory and located at a unique address. The database memory may be accessed by the microprocessor. Pointers may be stored 19 in the database, and each pointer may identify one of the unique addresses. Each pointer may be associated with an identification code that is at least one byte in length. Therefore, by knowing the identification code, the pointer may be discovered, and using the pointer, an object may be accessed, retrieved and provided to the user.

Using the input device, a user may select 22 one of the keys to provide a first selection. The first selection may be interpreted as being an indication of the identification code corresponding to an object that is desired by the user. Next, one of the keys of the input device may be selected 25 to provide a second selection. For example, if the user desires to have the word "better" displayed on the device, the user might press the "2abc" key followed by the "3def" key to identify that the desired object begins with the letter "b" followed by the letter "e". Of course, other objects might be identified by this series of selections, for example the word "after" or the address "23 Oakridge Drive".

The first and second selections may be associated 28 with each other, and provided as a first input. For example, using the example above, the first input that results from the user pressing the "2abc" key followed by the "3def" key might be comprised of the binary codes corresponding to those two keys. For example, the selection of the "2abc" key might result in a binary number two (0010) being provided as a first nibble of the first input, and the selection of the "3def" key might result in a binary number three (0011) being provided as a second nibble of the first input. Therefore, in this example, the binary two might be concatenated with the binary three to provide the first input, which would be a code that is one byte in length and represented as 00100011.

The first input may be compared 31 to a first one of the bytes of the identification codes. Some microprocessors are able to rapidly search a list of codes in a byte-by-byte fashion, for example an ARM processor. It is believed that when the microprocessor can rapidly compare bytes, then when the first input is one byte in length and is compared to the first byte of the identification codes, those identification codes having a first byte that matches the first input may be found more rapidly and with less power consumption than if the search had been performed by conducting a first search using the first selection to locate identification codes having the first selection in the first nibble, and then a second search using the second selection to identify those codes identified in the first search that have the second selection in the second nibble.

Pointers for which there is a match between the first input and the first byte of the identification code may be identified 34. For ease of reference, these identified pointers are referred to herein as a "first group of pointers", or sometimes as "pointers in the first group". Objects corresponding to the pointers in the first group may be provided 37 to the user.

If it is desired to reduced the number of objects provided to the user, additional keys may be selected. For example, another key of the input device may be selected to provide a third selection, and those pointers in the first group which have identification codes that have a character in the second byte of the identification code that matches the third selection may be identified. For example, a comparison of the first nibble in the second byte of the identification codes of the first group of pointers may be made to determine whether the first nibble of the second byte matches the third selection. Those pointers in the first group that have a character in the second byte that matches the third selection may be identified as a second group of pointers and used to identify objects that will be provided to the user. Hence, the second group of pointers may be a subset of the first group of pointers.

Alternatively, a key of the input device may be selected to provided a fourth selection, and the third and fourth selections may be associated as a second input. Then the second input may be compared to a second one of the bytes of the identification codes corresponding to the first group. As noted above, a byte-by-byte comparison may be rapidly carried out. Those pointers of the first group that are determined to have identification codes having a second byte that matches the second input may be determined to be within a second group of pointers. Hence, the second group of pointers may be a subset of the first group of pointers. Objects corresponding to the second group of pointers may be provided to the user.

To illustrate a method according to the invention, consider that the first input may specify a series of addresses to be searched, and that these addresses may be the locations of pointers that identify the location of objects desired by the user. Using the example above and noting that the first input may be represented in hexadecimal as 0x23, addresses from 0x23000000 to 0x23FFFFFF may be searched for the pointers corresponding to the first input. In this example, the address 0x238837FF may contain the pointer for the object "better", and the address 0x2337377F may contain the pointer for the object "address". In this example, the appearance of "F" is used to indicate an empty bit. Since many mobile phones have fewer than 16 keys, the "F" in a hexadecimal system may be used as a flag to indicate a particular state such as an empty bit. As the user makes further selections using the keys of the input device, the number of addresses that contain pointers to the desired object will be reduced.

To illustrate another method according to the invention, consider that the first input may specify a location where information regarding objects may be obtained. Using the example above, if the first input is 0x23, a computer may interpret the first input as an identification code indicating an address starting with 0x23, for example, 0x23FFFFFE. At 0x23FFFFFE, the computer may find a start address for all objects that begin with "2" or "a" or "b" or "c" and that have a second character that is "3" or "d" or "e" or "f". The computer may be programmed to use the next address, 0x23FFFFFF, as a second identification code which contains a pointer representing the number of objects or an end address for objects that begin with "2" or "a" or "b" or "c" and that have a second character that is "3" or "d" or "e" or "f". By having the pointer for the start address and the pointer for either the number of objects or an end address, the computer may then retrieve the objects corresponding to selection of the "2abc" key followed by selection of the "3def" key.

To further illustrate the example of the immediately preceding paragraph, as additional keys are selected, the computer may obtain different pointers. For example, if the user selects the "6nmo" key as the third selection, the computer may interpret the three selections as an instruction to go to an address starting with 0x236, for example, 0x236FFFFE. At 0x236FFFFE the computer may find an address and at 0x236FFFFF, the computer may find a number of objects or an end address. With these pointers, the computer can then retrieve objects such as "benign" and "cesium" and phone numbers beginning with "236".

Eventually, enough key selections will be made such that the number of possible objects indicated by the selected keys can be provided to a user, for example on a display associated with the user's cell phone or PDA. If the desired object is provided to the user along with other objects that are not desired by the user, the user may deterministically select one of the objects, for example, by using an arrow key to highlight the desired object and then an "enter" key to select the highlighted object.

When the user selects an object that has been provided to the user, the microprocessor may execute a program corresponding to the selected object. Such a program may cause the microprocessor to display prompts and information guiding the user through the process of using the object in the context in which it was selected. By way of example, if the user selects the "2abc" key twice, thereby indicating for example an identification code of 00100011 or an identification code of 0x22, and in response to the displayed candidates the user selects camera, then the machine may offer the user choices related to the camera function. The choices presented to the user might include text information describing how to use the camera function, or a button which causes a picture to be taken, or a button which causes a previously stored image to be sent. Assuming that for the sake of this example the user decides to take a picture, the user may be offered a choice to save the image or send the image or even erase the image. If send the image is selected, the user may be asked to enter the recipient. Then when the user selects keys on the input device, the executable instructions may cause the microprocessor to obtain the object in the memory which is the address of the person to whom the image should be sent. If the "5jkl" key were then selected twice, the machine might find all matching data types and might show the phone number 403 555 1212 as a matching contact number, amongst others. If however the user selected the "7prs" key followed by the "2abc" key, then Patricia might appear as a candidate. By selecting the desired object from the list of candidates, the machine might then cause the image to be sent. In this manner, key selections will be interpreted in the context of having previously indicated a desire to send the image, and so, objects presented to the user may be those that identify a recipient.

Figure 2:
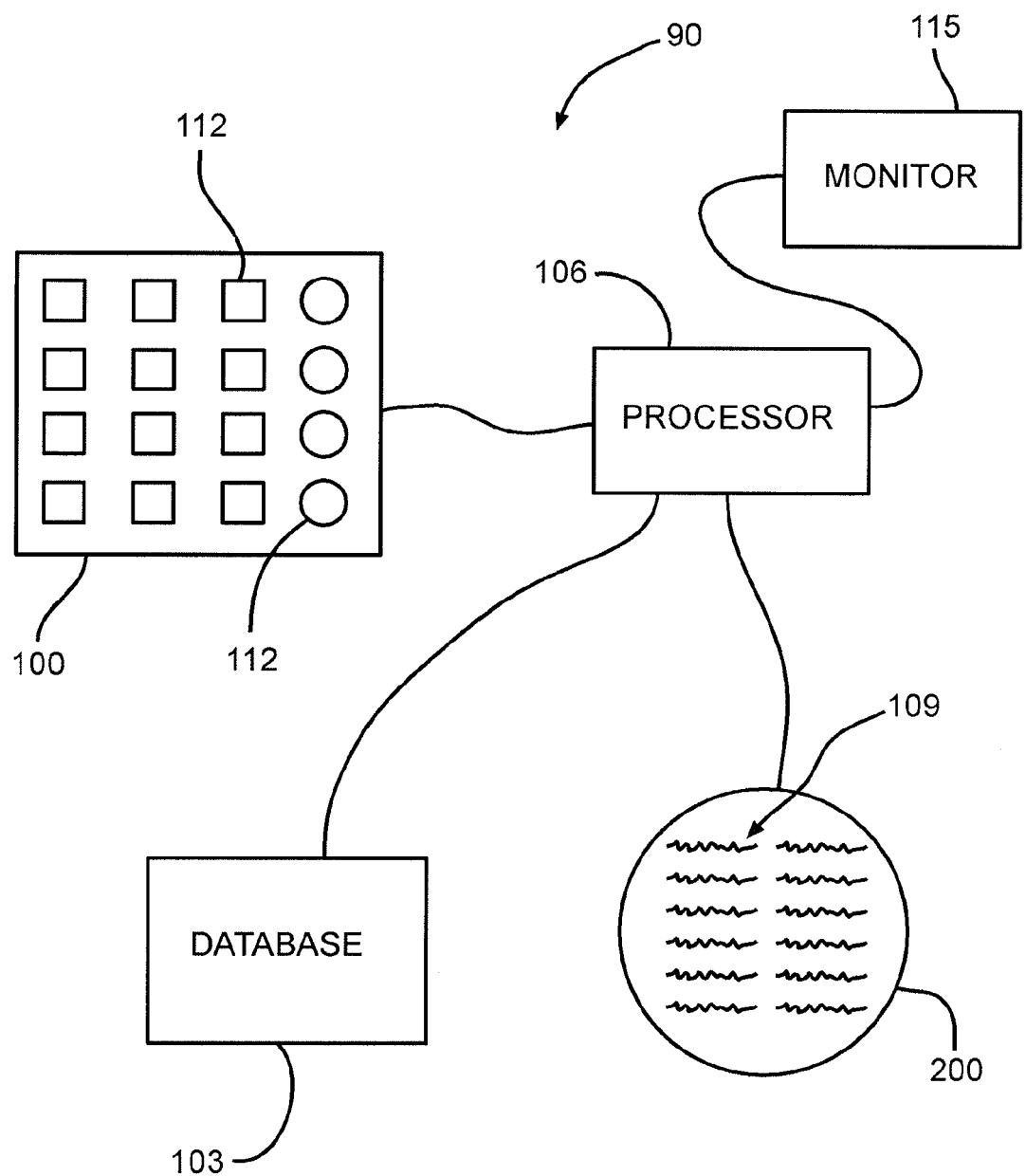
FIG. 2, which depicts a machine and a storage device according to the invention.

The invention may be embodied as a machine 90. FIG. 2 is a schematic of such a machine 90. In FIG. 2, there is shown an input device 100, a database 103, a processor 106 and executable instructions 109, which may take the form of software. The input device 100 may have at least two keys 112, some of which may correspond to more than one character. The database 103 may have a plurality of objects stored therein, each object being potentially desired by a user. The database 103 may also have pointers stored therein, each pointer identifying an address of an object. Each pointer may have an identification code that is at least one byte in length.

The processor 106 may be capable of executing the executable instructions 109. The executable instructions 109 may instruct the processor 106 to (a) accept selection of one of the keys 112 to provide a first selection, (b) accept selection of one of the keys 112 to provide a second selection, (c) associate the selections as a first input, (d) compare the first input to a first one of the bytes of the identification codes, (e) identify pointers for which there is a match between the first input and the byte, to provide a first group of pointers, and (f) provide objects corresponding to the identified pointers. The objects may be provided to a user via a display screen 115.

The executable instructions may have instructions capable of instructing the processor 106 to (a) accept selection of one of the keys to provide a third selection, and identify from among the first group of pointers those pointers having a character matching the third input, and (b) provide a second group of pointers.

In another embodiment of the machine 90, the executable instructions may have instructions capable of instructing the processor 106 to (a) accept selection of one of the keys 112 to provide a third selection, (b) accept selection of one of the keys 112 to provide a fourth selection, (c) associate the third and fourth selections as a second input, (d) compare the second input to a second one of the bytes of the identification codes, (e) identify pointers for which there is a match between the second input and the second byte and provide those pointers as a second group of pointers, and (f) provide objects corresponding to the identified pointers from the second group.

The invention may be embodied as a computer readable memory device 200, having executable instructions stored thereon. For example, the memory device 200 may be a CDROM having object code that is readable by a computer for causing a microprocessor to perform certain functions. The executable instructions may include instructions which cause the computer to accept a first selection and a second selection. The selections may be provided to the computer via an input device, such as the one described above. The instructions may also cause the computer to associate the selections as a first input, and then compare the first input to a first byte of a plurality of identification codes each of which corresponds to a pointer. The instructions may instruct the computer to identify those pointers for which there is a match between the first input and the byte, to provide a first group of pointers, and then instruct the computer to provide objects corresponding to the identified pointers.

The memory device 200 may also include instructions which cause the computer to accept a third selection, and identify from among the first group of pointers, those pointers having a character in a second byte of the identification codes that matches the third input, to provide a second group of pointers. The second group of pointers may be used to locate, access and provide the corresponding objects to a user.

The memory device 200 may also include instructions which cause the computer to accept a third selection and a fourth selection, and associate these selections as a second input. The instructions may cause the computer to compare the second input to a second byte of the identification codes, and identify from among the first group of pointers, those pointers for which the second input matches the second byte, to provide a second group of pointers. The second group of pointers may be used to locate, access and provide the corresponding objects to a user.

U.S. provisional patent application No. 60/628,209 discloses additional details about the invention and additional embodiments of the invention. The disclosure of that patent application is incorporated by this reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of providing information comprising:
providing an input mobile device having at least two keys, each of said at least two keys corresponding to more than one character;
storing objects in a database, each object having a unique address;
storing pointers in the database, each pointer identifying at least one of the unique addresses, and each pointer having an identification code that is at least one byte in length;
accepting selection of a first key press of one of the at least two keys to produce a first binary number;
following said accepting selection of the first key press, accepting selection of a second key press of one of the at least two keys to produce a second binary number;
concatenating the first and second binary numbers to create a first input having exactly one byte in length, wherein the first binary number is a first nibble of the first input and the second binary number is a second nibble of the first input;
comparing the byte of the first input to a first one of the bytes of the identification codes and based on the comparison, creating a set of identification codes, each identification code in the set having a first byte that matches the byte of the first input;
identifying a pointer for each identification code in said set of identification codes, to provide a first group of pointers; and
providing objects corresponding to the identified pointers;
wherein when it is desired to reduce the number of objects provided:
    accepting selection of a third key press of one of the at least two keys to produce a third binary number, wherein the third binary number is a third nibble of first input;
    comparing the third binary number with a first nibble in a second byte of identification codes associated with the first group of pointers and, based on said comparison, identifying from among the first group of pointers those pointers having a first nibble in a second byte that matches the third binary number, to provide a second group of pointers that is a subset of the first group of pointers; and
    providing objects corresponding to the second group of pointers.

2. The method of claim 1, further comprising:
following said accepting selection of the third key press, accepting selection of a fourth key press of one of the at least two keys to produce a fourth binary number;
concatenating the third and fourth binary numbers to create a second input having exactly one byte in length, wherein the third binary number is a first nibble of the second input and the fourth binary number is a second nibble of the second input;
comparing the byte of the second input to a second one of the bytes of the identification codes associated with the first group of pointers and based on the comparison, creating a second set of identification codes, each identification code in the second set having a second byte that matches the byte of the second input;
identifying a pointer for each identification code in said second set of identification codes, to provide a second group of pointers; and
providing objects corresponding to the identified pointers from the second group.

3. The method of claim 1, wherein the identification codes are addresses of the database.

4. The method of claim 1, wherein at least one of the pointers is a start address corresponding to a location where a first one of the objects corresponding to the first input may be found.

5. The method of claim 4, wherein at least one of the pointers is an end address corresponding to a location where a last one of the objects corresponding to the first input may be found.

6. The method of claim 4, wherein at least one of the pointers is a number representing how many objects correspond to the first input.

7. A machine, comprising:
an input device having at least two keys;
a database, having stored therein a plurality of objects, each object being potentially desired by a user, and having stored therein pointers, each pointer identifying at least one address of an object and each pointer having an identification code that is at least one byte in length;
a processor capable of executing instructions; and
executable instructions capable of instructing the processor to perform the steps of:
accepting selection of a first key press of one of the at least two keys to produce a first binary number;
following said accepting selection of the first key press, accepting selection of a second key press of one of the at least two keys to produce a second binary number;
concatenating the first and second binary numbers to create a first input having exactly one byte in length, wherein the first binary number is a first nibble of the first input and the second binary number is a second nibble of the first input;
comparing the byte of the first input to a first one of the bytes of the identification codes and based on the comparison, creating a set of identification codes, each identification code in the set having a first byte that matches the byte of the first input;
identifying a pointer for each identification code in said set of identification codes, to provide a first group of pointers; and
providing objects corresponding to the identified pointers;
wherein when it is desired to reduce the number of objects provided:
accepting selection of a third key press of one of the at least two keys to produce a third binary number, wherein the third binary number is a third nibble of first input;
comparing the third binary number with a first nibble in a second byte of identification codes associated with the first group of pointers and, based on said comparison, identifying from among the first group of pointers those pointers having a first nibble in a second byte that matches the third binary number, to provide a second group of pointers that is a subset of the first group of pointers; and
providing objects corresponding to the second group of pointers.

8. The machine of claim 7, wherein the executable instructions have instructions capable of instructing the processor to perform the steps of:
following said accepting selection of the third key press, accepting selection of a fourth key press of one of the at least two keys to produce a fourth binary number;
concatenating the third and fourth binary numbers to create a second input having exactly one byte in length, wherein the third binary number is a first nibble of the second input and the fourth binary number is a second nibble of the second input;
comparing the byte of the second input to a second one of the bytes of the identification codes associated with the first group of pointers and based on the comparison, creating a second set of identification codes, each identification code in the second set having a second byte that matches the byte of the second input;
identifying a pointer for each identification code in said second set of identification codes, to provide a second group of pointers; and
providing objects corresponding to the identified pointers from the second group.

9. The machine of claim 7, wherein the identification codes correspond to addresses of the database.

10. The machine of claim 7, wherein at least one of the identified pointers is a start address corresponding to a location where a first one of the objects corresponding to the first input may be found.

11. The machine of claim 10, wherein at least one of the identified pointers is an end address corresponding to a location where a last one of the objects corresponding to the first input may be found.

12. The machine of claim 10, wherein at least one of the identified pointers is a number representing how many objects correspond to the first input.

13. A computer readable memory device having stored thereon instructions that are executable by a computer, the instructions causing a computer to perform the steps of:
accepting selection of a first key press of one of the at least two keys to produce a first binary number;
following said accepting selection of the first key press, accepting selection of a second key press of one of the at least two keys to produce a second binary number;
concatenating the first and second binary numbers to create a first input having exactly one byte in length, wherein the first binary number is a first nibble of the first input and the second binary number is a second nibble of the first input;
comparing the byte of the first input to a first one of the bytes of the identification codes and based on the comparison, creating a set of identification codes, each identification code in the set having a first byte that matches the byte of the first input;
identifying a pointer for each identification code in said set of identification codes, to provide a first group of pointers; and
providing objects corresponding to the identified pointers;
wherein when it is desired to reduce the number of objects provided:
accepting selection of a third key press of one of the at least two keys to produce a third binary number, wherein the third binary number is a third nibble of first input;
comparing the third binary number with a first nibble in a second byte of identification codes associated with the first group of pointers and, based on said comparison, identifying from among the first group of pointers those pointers having a first nibble in a second byte that matches the third binary number, to provide a second group of pointers that is a subset of the first group of pointers; and
providing objects corresponding to the second group of pointers.

14. The memory device of claim 13, wherein the instructions further include instructions which cause the computer to perform the steps of:
following said accepting selection of the third key press, accepting selection of a fourth key press of one of the at least two keys to produce a fourth binary number;
concatenating the third and fourth binary numbers to create a second input having exactly one byte in length, wherein the third binary number is a first nibble of the second input and the fourth binary number is a second nibble of the second input;
comparing the byte of the second input to a second one of the bytes of the identification codes associated with the first group of pointers and based on the comparison, creating a second set of identification codes, each identification code in the second set having a second byte that matches the byte of the second input;
identifying a pointer for each identification code in said second set of identification codes, to provide a second group of pointers; and
providing objects corresponding to the identified pointers from the second group.

15. The memory device of claim 13, wherein one of the pointers in the first group is a start address corresponding to a location where a first one of the objects corresponding to the first input may be found.

16. The memory device of claim 13, wherein one of the pointers in the first group is an end address corresponding to a location where a last one of the objects corresponding to the first input may be found.

17. The memory device of claim 13, wherein one of the pointers in the first group is a number representing how many objects correspond to the first input.

* * * * *